March 22, 1966 P. T. PARKER 3,242,147
CHLOROSULFONATE CATALYSTS FOR POLYMERIZATION
Filed Jan. 2, 1963
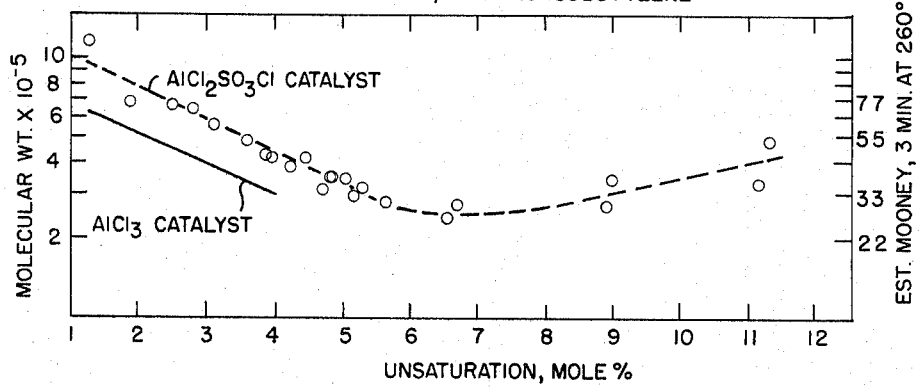
Paul Thomas Parker Inventors
By E. V. Haines
Patent Attorney

3,242,147
CHLOROSULFONATE CATALYSTS FOR POLYMERIZATION

Paul Thomas Parker, Baton Rouge, La., assignor to Esso Research and Engineering Company, a corporation of Delaware
Filed Jan. 2, 1963, Ser. No. 249,006
6 Claims. (Cl. 260—80.7)

The present invention relates to an improved process for producing high molecular weight butyl rubber through the use of a new catalyst system. More particularly, this invention employs as a catalyst a Friedel-Crafts catalyst in which one of the halide atoms appears to be replaced by a chlorosulfonate group to give dichloro aluminum chlorosulfonate, $AlCl_2SO_3Cl$. Further advantages derived by the use of this invention include the production of butyl rubber with a higher degree of unsaturation and the ability to incorporate a larger percentage of multiolefin in the feedstocks.

The invention will be better understood by referring to the accompanying drawing wherein the single figure is a graph plotting the data for unsaturation versus molecular weight (or Mooney viscosity) of the new butyl rubber polymers made by use of this invention. These data are plotted in comparison with the correlation for aluminum chloride catalyst, commonly used in Friedel-Crafts reactions.

In order to obtain the polymerization catalyst of this invention, the method of preparation must be carefully regulated. According to one method, dry anhydrous aluminum chloride is mixed with an equimolar amount of chlorosulfonic acid ($HSO_3Cl$) at a temperature below about 170° F. Room temperature is preferred. There is no heat of reaction and there is no evolution of HCl at these temperatures. The mixture is then heated to about 170° to 180° F. under anhydrous conditions and HCl is then given off. After HCl evolution has ceased, a period of about 20 to 30 minutes, the product is a viscous paste. If this material is heated to substantially higher temperatures, a hard, salt-like product forms. This solid material is not soluble and does not act as a catalyst for the preparation of butyl rubber. The reaction which takes place under the prescribed conditions is believed to be:

$$AlCl_3 + HSO_3Cl \rightarrow AlCl_2SO_3Cl + HCl$$

The precise structure of the catalyst is not known, but the empirical formula corresponds to $AlCl_2SO_3Cl$, and it will be referred to as such. It is essential to employ approximately equimolar amounts of aluminum chloride and chlorosulfonic acid to avoid exceeding the temperature limit during each of the two steps and to ensure that intimate contact between the two compounds is achieved. In the absence of intimate contact, or if there is a substantial molar excess of chlorosulfonic acid, it is possible that the reaction:

$$AlCl_3 + 2HSO_3Cl \rightarrow AlCl(SO_3Cl)_2 + 2HCl$$

may occur. (Here again, the structure of the sulfonated aluminum chloride is not precisely the above formula and is based on empirical data.) Monochloroaluminum di(chlorosulfonate) thus formed is a solid material which is relatively insoluble and not a good catalyst.

A second and preferred method of producing this catalyst employs 0.1 to 3.0% ethylchlorosulfonate in methylene chloride solution. The reaction is:

$$C_2H_5SO_3Cl + AlCl_3 \rightarrow AlCl_2SO_3CL + C_2H_5Cl$$

and is carried out at room temperature in dilute methylene chloride solution. Equimolar amounts of ethylchlorosulfonate and aluminum are used, and the mixture is stirred until all the aluminum chloride goes into solution. The concentration of the catalyst in the solution is between 0.6 and 5.0%. When prepared in this manner, the solution is ready to be used as a catalyst. (Evaporation of the solution leaves a viscous paste similar to the material prepared from aluminum chloride and chlorosulfonic acid in the dry state.)

Because of the tendency of some di-substituted aluminum chloride to be formed when relatively large amounts of catalyst is prepared, it is desirable to use a third procedure when preparing larger amounts. In this method, aluminum chloride is dissolved in sulfuryl chloride, $SO_2Cl_2$, to obtain a concentration of from 5 to 50%. An equimolar amount of chlorosulfonic acid is added at a slow rate so that a smooth, quiet HCl evolution takes place. This may be done at temperatures ranging from room temperature to about 100° F. For the production of 300 to 400 grams of catalyst, this addition procedure should take place over a period of several hours; it may take place overnight. The mixture is then refluxed until HCl evolution ceases, about 3 to 4 hours. The sulfuryl chloride solvent is then removed at reduced pressure to leave a viscous liquid whose analysis corresponds to $AlCl_2SO_3Cl$. The conditions under which the solvent is removed are critical, for if temperatures are too high, an insoluble product is obtained which has poor catalytic properties. At high vacuum, the temperature must be below 160° F., preferably 140° F.

The dichloroaluminum chlorosulfonate catalyst, when obtained, must be kept in a dry atmosphere to prevent formation of an insoluble hydrate. This hydrate, insoluble in methylene dichloride, is a gray solid which forms instantaneously upon contact with moisture. The actual structure of the catalyst is not known but corresponds closely to an analysis calculated for dichloroaluminum chlorosulfonate:

|  | Found, Wt. Percent | Calculated for $AlCl_2SOCl_3$, Wt. Percent |
| --- | --- | --- |
| Aluminum | 11.8 | 11.76 |
| Chlorine | 46.4 | 46.37 |
| Sulfur as Sulfate | 41.8 | 41.87 |
|  | 100.0 | 100.00 |

The elemental analysis indicates that the material is not a simple complex between aluminum chloride and a chlorosulfonic acid or between aluminum chloride and sulfuryl chloride. The fact that this material is a viscous liquid is surprising in view of the fact that inorganic salts of aluminum are solids. It is quite possible for the compound is associated in varying degrees, containing the following structure:

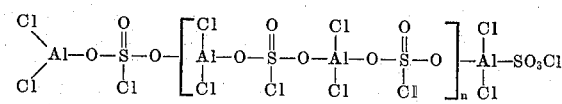

This might account for a melting point below room temperature. The compound may also be an equilibrium mixture of $$AlCl_3 \cdot SO_3 \rightleftarrows AlCl_2SO_3Cl \rightleftarrows \text{associated structure}$$

In addition to the dichloroaluminum chlorosulfonate catalyst, substitution of one of the halide atoms in other Friedel-Crafts type catalysts by chlorosulfonate groups would yield active polymerization catalysts which will produce polymers with high molecular weight and high unsaturation. Among the Friedel-Crafts type catalyst which may be so substituted are beryllium chloride, titanium trichloride, titanium tetrachloride, gallium chloride, stannous chloride, stannic chloride, molybdenum chloride, chromium chloride, etc.

Olefin polymerization feeds for the preparation of butyl-type rubbers according to this invention consist of isoolefins containing 4 to 7 carbon atoms, preferably isobutylene, and of conjugated diolefins (both linear and branched) containing 4 to 10 carbon atoms, for example, butadiene, isoprene, dimethyl butadiene, or piperylene, preferably isoprene. In contrast to the usual methods for preparing butyl rubbers where the amount of diolefin is limited to about 5%, by use of this invention, one may employ diolefins in concentrations of up to 30% and obtain substantially gel-free products. In contrast to other commercial methods of preparing butyl-type rubbers where the maximum unsaturation of the resulting polymer is about 3.5%, one may obtain up to about 12% unsaturation without gel formation by use of this invention. In addition, compounds such as cyclopentadiene and methylcyclopentadiene may be incorporated in amounts up to 6%, preferably from 0.5 to 2.0%, with isobutylene and isoprene to form terpolymers having greater ozone resistance. Terpolymers so formed by use of this invention compare favorably in molecular weight and percentage of unsaturation with the butyl rubber copolymers described in Example 2, below.

One preferred class of solvents for use with the present invention is $C_1$ to $C_5$ alkyl halides, i.e., monohalides and polyhalides. Thus suitable solvents include methyl chloride, ethyl chloride, methyl bromide, methylene chloride, carbon tetrachloride, etc., preferably methyl or methylene chloride. In addition, carbon disulfide and its analogues and homologues may be used. When the dichloroaluminum chlorosulfonate catalyst is prepared by the reaction of aluminum chloride and ethyl chlorosulfonate in a solution of methylene chloride, the catalyst formed in this solution is ready for use in polymerization if methylene chloride is chosen as the polymerization medium. Although liquid saturated hydrocarbon solvent may ordinarily be used for Friedel-Crafts type polymerization reactions, it has been discovered that the use of liquid saturated hydrocarbons with the catalyst of this invention does not result in an increase of molecular weight in the product polymer.

A critical factor in the use of this invention is the requirement of a catalyst concentration of at least 0.3 gram per 100 cc. Although dichloroaluminum chlorosulfonate catalyst employed in concentrations less than this amount gives satisfactory polymerization, it has been discovered that the increased molecular weight polymers are not obtained until the catalyst concentration reaches a level of about 0.3 gram per 100 cc. The reason for this effect may be attributed to the high degree of molecular association which the catalyst normally has; at low concentrations, the degree of association would be diminished and a lower molecular weight polymer would result as a consequence.

With the exception of the requirement for somewhat higher catalyst concentrations, the polymerization reaction itself proceeds under the usual butyl rubber reaction conditions employing Friedel-Crafts type catalysts. The mixture of monomers, in 1 to 5 volumes of inert diluent as outlined above, should be cooled to a temperature of between 0 and —200° C., preferably between —60 and —130° C. The catalyst is then added and the mixture kept under vigorous agitation. The polymerization reaction is rapid and the polymer precipitates out of solution in the form of a slurry or a flocculent white solid. The preparation of these polymers are fully described in U.S. Patent 2,356,128, which is incorporated here by reference.

The invention will be better understood from the following experimental data and examples, which are intended for illustrative purposes only and not as limitations.

EXAMPLE 1

Isobutylene and isoprene were polymerized using the following substances as catalysts: aluminum chloride, dichloroaluminum chlorosulfonate, and monochloroaluminum dichlorosulfonate. The monomer feedstocks consisted of 11.7 wt. percent of isobutylene in methyl chloride plus amounts of isoprene varying from 3 wt. percent to 12 wt. percent. The aluminum chloride catalyst was prepared by dissolving anhydrous aluminum chloride in methylene chloride. The dichloroaluminum chlorosulfonate catalyst was prepared by reacting anhydrous aluminum chloride and ethyl chlorosulfonate in methylene dichloride solution at room temperature. The resulting catalyst solution was then employed in a polymerization reaction. The monochloroaluminum di(chlorosulfonate) catalyst was prepared by reacting 200 mol percent of chlorosulfonic acid with aluminum chloride at a temperature of 180° F. Pressure was reduced for 30 minutes in order to remove all traces of free HCl. The resultant product was a salt-like material, not appreciably soluble in methylene chloride; this was used as a catalyst in the polymerization reaction. In all cases, the polymerization temperature was —150° F. Table I is a comparison of molecular weight data for each of the three catalysts. Feed B—No. is the weight of isoprene based on isobutylene in the feed stock.

Table I

| Catalyst | Feed B—No. | | | | |
|---|---|---|---|---|---|
| | 3 | 6 | 8 | 10 | 12 |
| $AlCl_3$ Mol. wt. $\times 10^{-3}$ | 605 | 420 | 400 | | |
| $AlCl_2SO_3Cl$ Mol. wt. $\times 10^{-3}$ | 1,159 | 655 | 476 | 304 | |
| $AlCl(SO_3Cl)_2$ Mol. wt. $\times 10^{-3}$ | | 350 | | 272 | 245 |

These data clearly indicate that dichloroaluminum chlorosulfonate when used as a catalyst, yields butyl rubbers of substantially higher molecular weight than the aluminum chloride catalyst ordinarily employed in the Friedel-Crafts reaction. In addition, they show that the monochloroaluminum di(chlorosulfonate) catalyst, which is believed to be formed when there is a molar excess of chlorosulfonate to aluminum chloride, is also a substantially poorer catalyst in terms of resultant polymer molecular weight than the catalyst of this invention.

EXAMPLE 2

Under the polymerization conditions set forth in Example 1, various butyl rubber polymers were prepared. In these runs, the catalyst concentration was varied and its effect on molecular weight was studied.

Table II

| Cat. Conc., g./100 cc. | Unsaturation, percent | Mol. wt. $\times 10^{-3}$ | Mooney, at 260° F. |
|---|---|---|---|
| B-6 Feed Stock: | | | |
| .15 | 3.26 | 382 | 40 |
| .25 | 2.89 | 499 | 55 |
| .34 | 3.13 | 555 | 62 |
| .43 | 2.81 | 631 | 71 |
| .56 | 2.78 | 567 | 63 |
| .69 | 1.88 | 677 | 77 |
| B-8 Feed Stock: | | | |
| .25 | 4.78 | 318 | 32 |
| .39 | 4.25 | 374 | 39 |
| .43 | 3.92 | 413 | 44 |
| B-10 Feed Stock: | | | |
| .20 | 4.15 | 336 | 34 |
| .43 | 4.48 | 407 | 43 |
| B-12 Feed Stock: | | | |
| .20 | 5.09 | 245 | 23 |
| .20 | 5.00 | 246 | 23 |
| .41 | 5.18 | 296 | 29 |
| .50 | 5.08 | 340 | 35 |

The table indicates that, in order to achieve improved molecular weight, it is necessary to have the catalyst concentration above about 0.3 gram per 100 cu. cm. The data for polymers using the requisite catalyst concentration are plotted in the accompanying drawing.

EXAMPLE 3

Dichloroaluminum chlorosulfonate catalyst produced according to the method of Example 1 was used to polymerize mixtures of isobutylene and isoprene in varying ratios. The polymers were produced under the conditions of Example 1. The degree of unsaturation of the resultant copolymers was measured and the results are tabulated in Table III.

*Table III*

| Feed B—No. | Conv., percent | Mooney, 212° F. est. | Mooney, 260° F. est. | Unsat., Mol. percent | Gel Wt., percent |
|---|---|---|---|---|---|
| 12 | 65 | 52 | 37 | 5.08 | 0 |
| 20 | 64 | 51 | 36 | 8.93 | 0 |
| 24 | 72 | 51 | 36 | 11.17 | 0 |
| 30 | 73 | 76 | 52 | 11.28 | 0 |
| 50 | 66 | Insoluble | | 12.70 | 5.5 |

These data, also plotted in the accompanying drawing, indicate that, with use of a catalyst of this invention, a series of polymers having unsaturation as high as 9 to 11% can be obtained. This is considerably higher than the maximum commercial unsaturation of about 3.5%. By maintaining the isoprene content of the feedstock at a level of between 20 and 30%, one may obtain copolymers with up to about 12% unsaturation. Increasing the isoprene content markedly above the 30% level, e.g. to 50%, raises the unsaturation slightly and gives mainly gel formation. Further, the increase in Mooney viscosity from 51 to 76 (at 212° F.) when the isoprene content is increased from 24 to 30% indicates that some incipient cross-linking takes place in this range of isoprene content.

EXAMPLE 4

Dichloroaluminum chlorosulfonate, prepared according to the method of Example 1, dissolved in methylene chloride, was used as a catalyst for the production of butyl rubber. The polymerization was run under the conditions of Example 1. The concentration of catalyst in methylene chloride solution was 0.43%. The diluents used for the polymerization reaction was methylchloride and n-hexane. Data on the resulting copolymers are tabulated in Table IV.

*Table IV*

| Feed B—No. | 6 | 6 |
|---|---|---|
| Diluent | Methyl chloride | n-hexane. |
| Conversion, percent | 63 | 63. |
| Mol. Wt.×10⁻³ | 631 | 131. |
| Unsaturation | 2.81 | 3.73. |

The hydrocarbon diluent appears to give very low molecular weight polymer as compared with the polymer produced in the methyl chloride diluent. At the same time, however, the increased unsaturation of the polymer produced in n-hexane indicates that there is a higher reactivity ratio of isoprene in the hydrocarbon diluent than in the methyl chloride diluent.

EXAMPLE 5

In these runs, a comparison was made between catalyst prepared in sulfuryl chloride and catalyst prepared in methylene chloride solution as in Example 1. The catalyst in sulfuryl chloride was prepared by first dissolving aluminum chloride in sulfuryl chloride and then gently refluxing the solution; the concentration of aluminum chloride was 20%. An equimolar amount of chlorosulfonic acid was added at a slow rate, causing a smooth evolution of hydrogen chloride. After an additional 30 minutes of gentle refluxing, hydrogen chloride evolution ceased. The solvent was then completely removed by vacuum stripping (20–25″ Hg) at a bath temperature of 218° F. The catalyst, which was recovered in amounts 100% of a theoretical amount, is a viscous liquid whose analysis corresponds to $AlCl_2SO_3Cl$. Butyl rubber was then prepared using this catalyst, and the resultant properties were compared with the results expected based on catalyst prepared according to the method of Example 1. The polymers were prepared under the conditions set forth in Example 1. The data are tabulated in Table V.

*Table V*

| | Results Obtained | | Results Expected | |
|---|---|---|---|---|
| Feed B–No | 8.0 | | | |
| Conversion, percent | 83 | 50 | | |
| Mol. Wt.×10⁻³ | 345 | 413 | 350 | 440 |
| Unsaturation | 4.82 | 3.95 | 4.82 | 3.95 |

The use of sulfuryl chloride as a solvent for catalyst preparation is advantageous in that it is a good solvent for aluminum chloride and its boiling point (156° F.) and volatility are such that it can be readily removed from the product without excessive heat. There is the disadvantage, however, in that all solvent must be removed because any residual solvent or HCl will be deleterious to the polymerization reaction. When the solvent is completely removed, the product polymers obtained by the use of the catalyst made in this way compare very favorably with expected results using catalyst made in the more conventional method.

EXAMPLE 6

Three samples of dichloroaluminum chlorosulfonate catalyst, prepared according to the method of Example 1, were allowed to age in methylene dichloride solution in glass for periods up to a week at room temperature. The catalysts were then used in the *preparation of butyl rubber* and compared with the butyl rubber prepared by using these catalysts immediately after their preparation. The polymers were prepared under the conditions of Example 1. The data are shown in Table VI.

*Table VI*

| | A | | B | | C | |
|---|---|---|---|---|---|---|
| Cat. Solution age—days | 0 | 3 | 0 | 6 | 0 | 7 |
| Cat. Conc.—g./100 cc | 0.44 | 0.46 | 0.50 | 0.51 | 0.36 | 0.36 |
| Feed B—No | 6 | 6 | 6 | 6 | 6 | 6 |
| Conversion, percent | 76 | 93 | 85 | 71 | 80 | 62 |
| Mol. Wt.×10⁻³ | 518 | 540 | 454 | 497 | 586 | 472 |
| Unsaturation, percent | 2.61 | 2.43 | 3.26 | 2.70 | 2.54 | 2.62 |

These data indicate that the catalyst may be aged in methylene chloride solution up to about a week without having any deleterious effects upon the resultant polymer.

The undissolved catalyst shows no visible change over a period of a month or more at ambient temperatures.

EXAMPLE 7

To determine if the inclusion of cyclodiolefin in high unsaturated butyl rubber to impart increased ozone resistance will seriously degrade molecular weight when using the chlorosulfonate catalyst of this invention, various runs were made. The feed stocks contain varying amounts of isoprene and cyclopentadiene or methylcyclopentadiene. The results indicate that fairly substantial amounts of these cyclodiolefins can be included in high unsaturated butyl rubbers without extensive loss of molecular weight. The catalyst and the polymers were prepared according to the methods set forth in Example 1. The data are set forth in Table VII.

Table VII

| Cyclopentadiene | Methyl-cyclopentadiene | Unsaturation, Percent | Mol. Wt. ×10⁻³ | Mooney at 260° F. |
|---|---|---|---|---|
| Wt. Percent Based on Isobutylene | | | | |
| B-6 Feed Stock: | | | | |
| 0 | 0 | 2.81 | 375 | 39 |
| 3 | 0 | 5.39 | 284 | 28 |
| B-12 Feed Stock: | | | | |
| 0 | 0 | 5.18 | 302 | 30 |
| 2 | 0 | 7.59 | 254 | 25 |
| 0 | 2 | 6.44 | 242 | 23 |
| 0 | 4 | 7.33 | 229 | 21 |
| 0 | 6 | 7.79 | 207 | 18 |

While there are above described a number of specific embodiments of the present invention, it is obviously possible to produce other embodiments and various equivalent modifications and variations thereof without departing from the spirit of the invention or the scope of the appended claims.

What is claimed is:

1. A process for producing high molecular weight butyl rubber having up to 12 mole percent unsaturation based on the number of double bonds in the monomer units which comprises polymerizing in an alkyl halide solvent a mixture of a $C_4$ to $C_7$ isoolefin and a $C_4$ to $C_{10}$ multiolefin, containing 0.5 to 30.0 wt. percent of multiolefin based on isoolefin, in the presence of a solution of a catalyst having the formula $AlCl_2SO_3Cl$, said solution having a concentration of at least 0.3 gram, per 100 cc. of solution, to a solid polymer having a molecular weight of about 300,000 to 600,000.

2. The process of claim 1 in which the isoolefin is isobutylene and the multiolefin is isoprene.

3. The process of claim 1 in which the catalyst is prepared by mixing anhydrous aluminum chloride with an equimolar amount of chlorosulfonic acid at a temperature of from 50° to 150° F. and subsequently heating the mixture to a temperature of from 170° to 180° F. until hydrogen chloride is no longer evolved.

4. The process according to claim 1 in which the catalyst is prepared by combining aluminum chloride with an equimolar amount of ethyl chlorosulfonate in an alkyl halide solvent.

5. The process of claim 1 in which the catalyst is prepared by adding an equimolar amount of chlorosulfonic acid to a refluxing solution of aluminum chloride in sulfuryl chloride, refluxing the mixture until hydrogen chloride is no longer evolved, and removing the sulfuryl chloride solvent by heating said solution to a temperature no greater than 160° F.

6. A process for producing high molecular weight butyl rubber having up to 12 mole percent unsaturation based on the number of double bonds in the monomer units which comprises polymerizing in an alkyl halide solvent a mixture of a $C_4$ to $C_7$ isoolefin, a $C_4$ to $C_{10}$ multiolefin, and a $C_5$ cyclic diolefin, containing 0.5 to 30 wt. percent of multiolefin and 1 to 6 wt. percent of $C_5$ cyclic diolefin both based on isoolefin, in the presence of a solution of a catalyst having the formula $AlCl_2SO_3Cl$, said solution having a concentration of at least 0.3 gram, per 100 cc. of solution, to a solid polymer having a molecular weight of about 200,000 to 400,000.

References Cited by the Examiner
UNITED STATES PATENTS 2,809,372   10/1957   Frederick et al. _____ 260—85.3

JOSEPH L. SCHOFER, *Primary Examiner.*